United States Patent [19]
Doyle et al.

[11] 3,942,849
[45] Mar. 9, 1976

[54] AUXILIARY SEALING STRUCTURE FOR A SHAFT BEARING

[75] Inventors: Lester W. Doyle; Bernard T. Veldman, Sr., both of Mishawaka, Ind.

[73] Assignee: Reliance Electric Company, Mishawaka, Ind.

[22] Filed: Sept. 23, 1974

[21] Appl. No.: 508,505

[52] U.S. Cl. .............................. 308/187.1; 308/36.1
[51] Int. Cl.² ...................... F16C 1/24; F16C 33/72
[58] Field of Search ....... 308/189, 36.1, 187, 187.1; 277/21, 59, 169

[56] References Cited
UNITED STATES PATENTS

| | | | |
|---|---|---|---|
| 3,656,824 | 4/1972 | Ullberg | 308/187.1 |
| 3,758,179 | 9/1973 | Smith | 308/187.1 |
| 3,848,938 | 11/1974 | Stella et al. | 308/187.1 |
| 3,869,131 | 3/1975 | Derner | 308/187.1 |

*Primary Examiner*—Robert R. Song
*Assistant Examiner*—Richard A. Bertsch
*Attorney, Agent, or Firm*—Marmaduke Hobbs

[57] ABSTRACT

An auxiliary sealing structure for a shaft bearing having a housing, in which a segmented collar is adapted to be clamped onto the end of the bearing housing using interlocking opposite facing shoulders on the housing and collar. The two segments of the collar are secured together to clamp the shoulders into interlocking relationship and thereby secure the auxiliary seal on the end of the housing. The collar contains an annular groove or recess in which a seal is seated, the seal being either of the labyrinth or gasket type. Various configurations for the two oppositely facing shoulders on the housing and collar may be used; however, tapered shoulders are preferred, which result in a firm securing action between the housing and collar when the bolts or other securing means connecting the collar segments are tightened.

11 Claims, 12 Drawing Figures

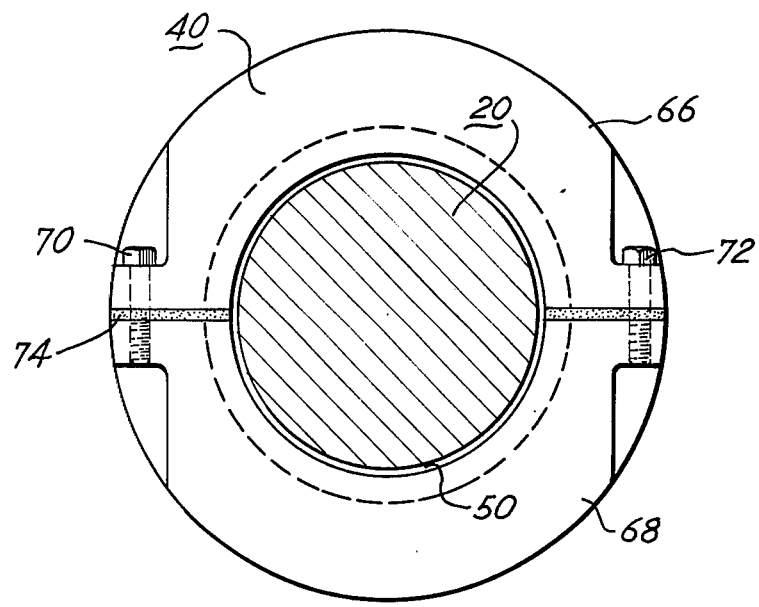
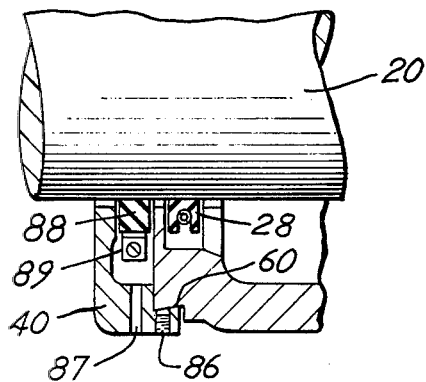
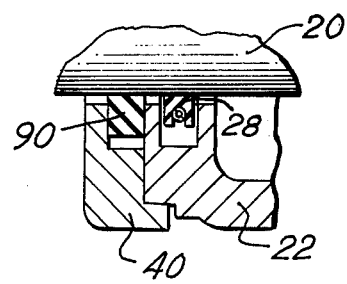
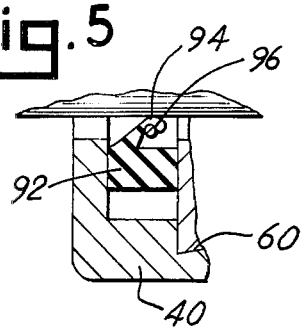
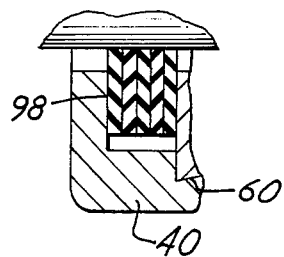
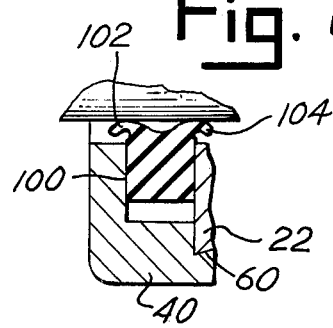

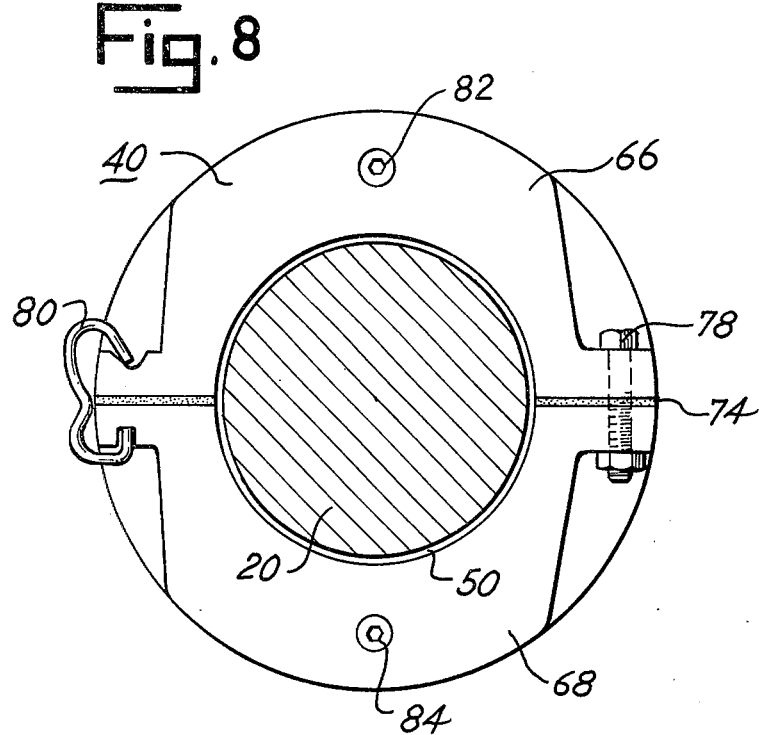
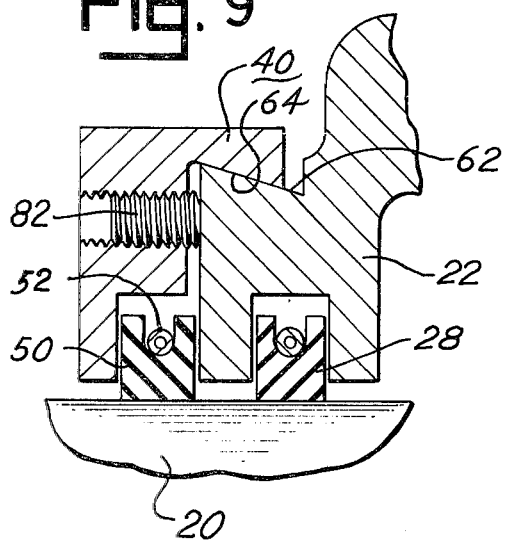
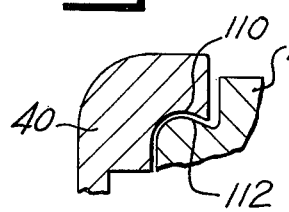
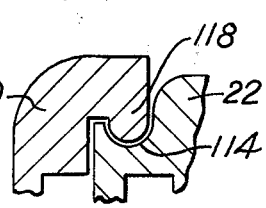
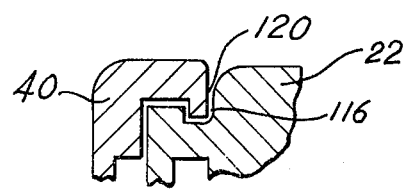

AUXILIARY SEALING STRUCTURE FOR A SHAFT BEARING

Bearing structures for rotating shafts are often provided with seals at the ends of the bearings to prevent the lubricant in the bearing from escaping along the shaft surface, and to prevent foreign material in the operating environment from entering and damaging the bearing. The problem of excluding foreign material may be critical and particularly difficult in some operating conditions where the bearing is operating at relatively high temperatures, and in an atmosphere containing acids and fine particles such as grit, or where it is in contact with corrosive liquids and abrasive substances. In the past, the conventional bearings were initially provided with a single seal at each end, usually consisting of an elastomeric annular seal or gasket seating in a groove in the bearing housing and contacting the surface of the rotating shaft. When these single seals have been ineffective in preventing the injurious foreign substances from entering the bearing, the practice sometimes used has been to install an auxiliary seal or gasket on the end of the housing, thus providing a double seal to obtain improved protection to the bearing. The auxiliary seals have normally been slipped on the shafts and secured to the bearing ends of the housing by screws or bolts extending through the seal structure and into threaded holes in the housing. Since these auxiliary seals are usually installed in the field, it has often been necessary to disassemble the equipment or machinery by removing the shaft from the bearings, and in some instances to drill and tap holes in the ends of the bearing housing for securing the auxiliary bearing in place. This has been an inconvenient and time consuming operation, and consequently has often been avoided to the detriment of the bearing and shaft. It is therefore one of the principal objects of the present invention to provide an auxiliary bearing structure which can easily and quickly be mounted on a shaft and secured to the bearing housing without disassembling the equipment of machinery, and which does not require drilling and tapping holes in the bearing housing or other modification of the bearing housing in the field.

Another object of the invention is to provide a bearing structure which can be used with or without an auxiliary seal and can be readily equipped with an auxiliary seal in the field if required, and which can easily be serviced and replaced without disassembling the equipment or machinery on which it is installed.

A further object is to provide an auxiliary bearing seal which is relatively simple in construction and operation and can be easily removed and inspected from time to time, and replaced if it becomes inefficient or defective, and which gives added protection to the permanent bearing seal so that the permanent seal will give substantially longer trouble-free service.

Additional objects and advantages of the present invention will become apparent from the following description and accompanying drawings, wherein:

FIG. 2 is a side elevational view of the auxiliary seal shown in FIG. 1, with the shaft extending therethrough being shown in cross section taken on line 2 — 2 of FIG. 1;

FIG. 3 is a fragmentary view of a shaft and a portion of the pillow block housing and seals shown in cross section;

FIGS. 4, 5, 6 and 7 are fragmentary views of the shaft and housing and seal or seals, illustrating various embodiments of the present invention;

FIG. 8 is a side elevational view of the auxiliary seal with the shaft being shown in cross section, illustrating a modified form;

FIG. 9 is a fragmentary cross sectional view of the pillow block shown in FIG. 1 and a modified form of the auxiliary seal, showing the shaft extending therethrough; and FIGS. 10, 11 and 12 are fragmentary cross sectional views of modified forms of the present auxiliary seal and the adjacent end of the pillow block.

Figure 1:
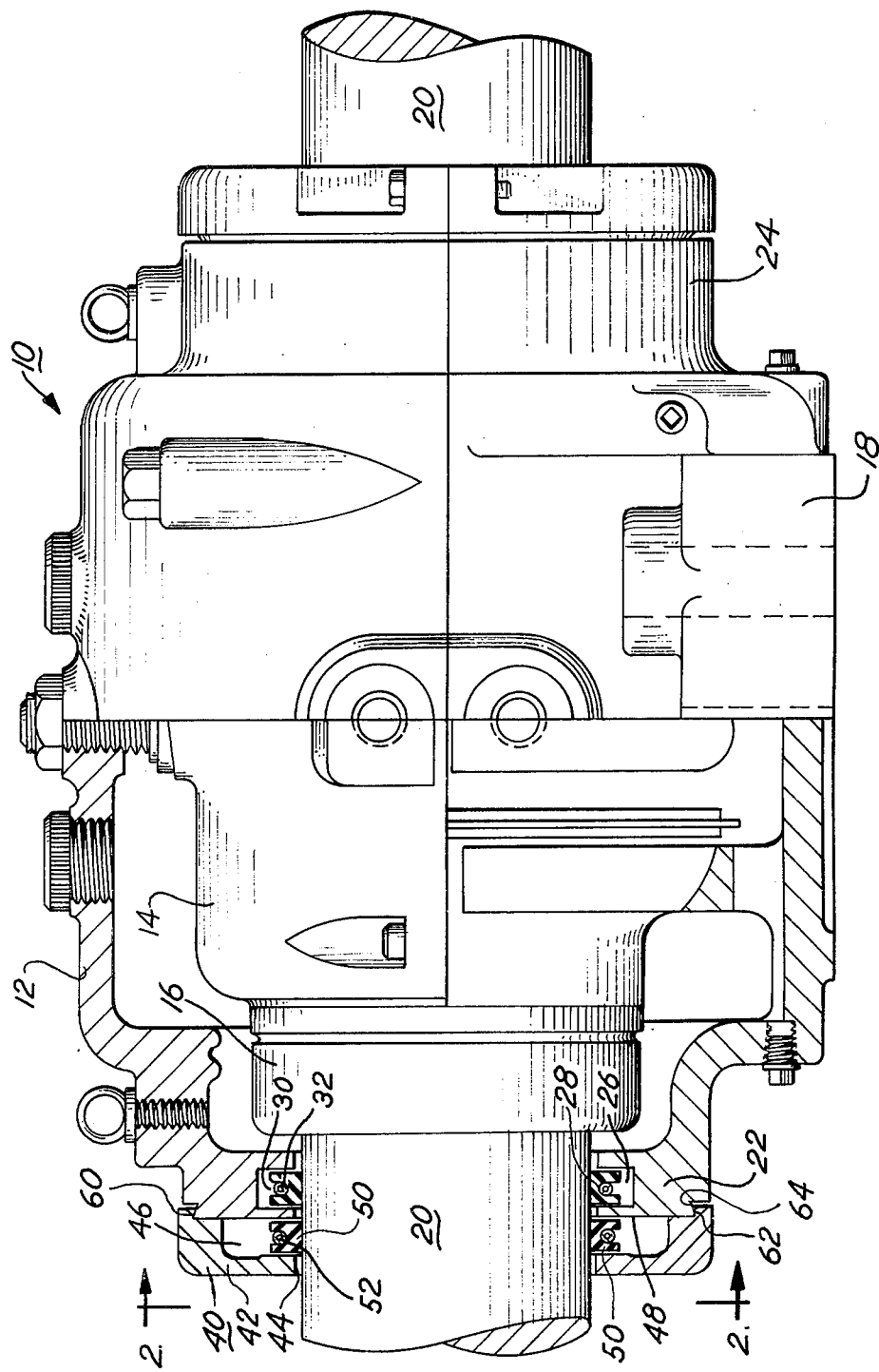
FIG. 1 is a slide elevation and partial vertical cross sectional view of a pillow block illustrating one form of the invention.

Referring more specifically to the drawings and to FIG. 1 in particular, numeral 10 indicates generally a pillow block having a housing 12, bearing insert 14, collar 16 and base 18, a shaft 20 being shown journalled in the bearing insert and extending outwardly from the two ends of the housing. The overall structure is not important to the present invention, the particular pillow block shown being merely for the purpose of illustrating the present invention.

Each end of the housing has end walls 22 and 24 with openings therein through which the shaft extends. The inner edge of each end wall contains an annular groove 26 in which an annular seal 28 is disposed, the seal shown consisting of a ring shaped body with an outer groove 30 in which a coil spring 32 is seated. The spring applies radial pressure to the seal, pressing it firmly against the surface of shaft 20. The seal may be a labyrinth seal fitting loosely in groove 26 and rotating with the shaft and normally preventing seepage of oil or lubricant from the housing and bearing insert, and likewise normally preventing foreign matter such as grit, water and the like from entering the housing. However, in adverse operating environments, the seal may be inadequate to prevent contaminants such as abrasive particles and acid containing liquid or moisture from passing the seal and entering the bearing insert where substantial damage ultimately would result, causing excessive wear and premature failure of the bearing.

The present auxiliary sealing structure 40 is shown on the left hand end of the housing, as seen in FIG. 1, the sealing structure consisting of a collar 42 having an opening 44 therein and an annular recess 46 disposed on the inner side of the collar. In combination with the adjacent end wall 48 of the housing, the inner wall of the collar forms a groove for receiving an annular seal or gasket 50 similar to the seal 28, the seal consisting of the annular body of rubber or other elastomeric material held in contact with the surface of the shaft by a coil spring 52 which applies radial pressure to the seal. The groove or recess 46 defined by the external end wall of the housing and the internal wall of collar 42 and seal 50, form a labyrinth sealing relationship so that water or other liquids and foreign matter cannot readily pass around the seal in recess 46. The opening 44 in the collar is sufficiently large that it does not contact the surface of shaft 20 or interfere with the sealing action of seal 50.

The auxiliary sealing member 40 is secured to the end wall of the housing by the interlocking shoulder structure identified by numeral 60, the shoulder 62 on the housing being tapered inwardly. Thus when the two are placed in contact with one another, the opposed tapered shoulders retain the collar in a fixed and firm position on the end of the housing. The collar and seal are preferably of two parts, such as illustrated in FIGS. 2 and 8, the collar consisting of sections 66 and 68 secured together by screws 70 and 72, the two screws extending through holes in section 66 into threaded holes in section 68. When the auxiliary seal is to be mounted on the pillow block, the two sections are separated from one another sufficiently to permit the two tapered shoulders 62 and 64 to be placed in interlocking relationship. Tightening of the two screws 70 and 72 thereafter draws the two sections together and firmly locks the two tapered shoulders together, thus retaining the auxiliary seal rigidly in place on the end of the housing wall. A compressible gasket 74 is preferably disposed between the two collar sections which closes the space between the sections without interfering with the seating of the interlocking shoulders.

In the embodiment illustrated in FIG. 8, the two sections 66 and 68 are secured together by a bolt 78 and a clamp 80, thus facilitating rapid installation of the auxiliary seal. The clamping operation is similar to that shown in FIG. 2, except that a pair of set screws 82 and 84 in sections 66 and 68 urge the collar outwardly from the end wall of the housing and, in so doing, force the two tapered surfaces firmly together, thus effectively tightening the collar on the end of the housing. The seal disposed in the groove in the collar is essentially the same as those previously described herein, including body 50 and coil spring 52, the body being spaced from the side wall of the groove so that a labyrinth type of seal is formed, with the seal rotating with the shaft.

FIGS. 3, 4, 5, 6 and 7 illustrate various other forms of seals which may be incorporated in the auxiliary sealing structure and, since the sealing structure is similar in many respects to that previously described herein, like numerals will be used to identify like parts. In the embodiment shown in FIG. 3, a plurality of set screws 86 extend inwardly from the periphery of the collar to engage the tapered surface on the end of the housing. Since the set screws engage the tapered surface, they tend to pull the collar firmly against the end of the housing. The set screws likewise prevent rotation of the collar in the event the collar should become loose during operation. A drain hole 87 is shown in this embodiment and may be used in any one of the other embodiments. The gasket 88 is the labyrinth type having a band and screw securing means 89 seated in the collar recess.

In the embodiment of FIG. 4, the two shoulders 62 and 64 are not tapered but rather are parallel to the axis of the shaft. The collar may be held in position on the shoulder of the housing end wall merely by the clamping action of the two screws 70 and 72 or the clamping action of bolt 78. A plurality of equally spaced set screws may likewise be used to retain the collar on shoulder 62 if desired. The seals shown in FIGS. 4, 5, 6 and 7 are essentially the gasket type in which elastomeric material or other suitable sealing material is placed in groove 46 in sufficient engagement with the side walls of groove 46 that a seal is formed between the gasket and the side walls of the groove. The gasket is stationary and shaft 20 rotates relative thereto. In FIG. 4, seal 90 is rectangular in cross section and fits snugly in groove 46 and seats on shaft 20 for relative rotation therebetween. Seal 92 shown in FIG. 5 seats firmly in groove 46 and has a flange or inwardly extending annular edge 94 held into sealing relationship with the shaft by wire 96. In FIG. 6, the seal 98 seats firmly in groove 46 and consists of a plurality of separate layers of rubber or other elastomeric material. The seal seats on the shaft and the shaft rotates relative to the seal. Seal 100 in FIG. 7 is similar to that shown in FIG. 4 but contains two annular lips 102 and 104 which seat on the rotating shaft 20. The various forms shown may be used satisfactorily in a number of different installations, and may be interchangeable with one another and with those previously described herein. The manner in which the collar is secured to the end wall of the housing may be the same as those shown in FIGS. 2, 3 and 8.

FIG. 10 illustrates a modified form of interlocking shoulders in which the two shoulders 110 and 112 on the collar and housing end are curved but still provide interlocking tapered surfaces near the inner edge of the collar. The collar is held in place in the same manner as previously described herein. FIGS. 11 and 12 illustrate further modifications, the housing ends having rather distinct grooves 114 and 116, respectively, and the collars having annular ribs 118 and 120 for seating in said respective grooves. After the annular ribs 118 and 120 are placed in the grooves 114 and 116, the screws 70 and 72 or 78 are tightened to clamp the two sections 66 and 68 of the collar around the shaft and lock the rib in the groove.

In using the auxiliary seal structure described herein, the pillow block or other bearing structure is installed in the usual manner, and, if the auxiliary seal is required, it may be mounted on the housing of the pillow block at any time without removing the shaft from the pillow block or otherwise disassembling the equipment or machine. This is accomplished by separating the two sections 66 and 68 by removing screws 70 and 72 of the embodiment of FIG. 2 or screw 78 of the embodiment of FIG. 8, and placing the collar around the shaft with the shoulders on the collar and on the end of the housing interlocking with one another. As the screws are tightened, the shoulders are held firmly together and the collar retained rigidly in place around the shaft on the end of the housing. In the embodiment of FIG. 8, the two sections are initially clamped together by clamp 80 and secured rigidly in place by inserting bolt 78 in the holes provided therefor and tightening the bolt firmly. The collar may be attached by using any one of the interlocking shoulder embodiments disclosed herein.

While several embodiments and modifications of the present auxiliary bearing seal structure have been described in detail herein, further modifications may be made to satisfy requirements.

We claim:

1. An auxiliary sealing structure for a shaft bearing having a housing, comprising a collar having two sections for encircling a shaft and having an inwardly facing recess, a seal disposed in said recess for engaging the surface of the shaft, an outwardly radially facing shoulder on the end of the bearing housing, an inwardly radially facing shoulder on said collar for engaging the shoulder on the housing, and means interconnecting said collar section for securing said shoulders together and retaining said collar on the end of the bearing housing.

2. An auxiliary sealing structure for a shaft bearing as defined in claim 1 in which the shoulder on said housing is annular in shape and is tapered inwardly with a decreasing diameter toward the housing end and the shoulder on said collar has a corresponding taper.

3. An auxiliary sealing structure for a shaft bearing as defined in claim 2 in which the shoulder on said collar is annular in shape and is tapered with an increasing diameter inwardly from the corresponding edge of said shoulder.

4. An auxiliary sealing structure for a shaft bearing as defined in claim 3 in which set screws parallel with the axis of the shaft urge the collar away from the end of the housing, thereby urging said tapered surfaces into rigid contact with one another.

5. An auxiliary sealing structure for a shaft as defined in claim 3 in which said sections of the collar are substantially equal and bolts on opposite sides of the collar hold said sections together and force said tapered surfaces into firm engagement with one another.

6. An auxiliary sealing structure for a shaft bearing as defined in claim 5 in which said seal is of the labyrinth type and the end of the bearing housing forms one wall of said recess.

7. An auxiliary sealing structure for a shaft bearing as defined in claim 1 in which the shoulder on said collar is annular in shape and is tapered with an increasing diameter inwardly from the corresponding edge of said shoulder.

8. An auxiliary sealing structure for a shaft as defined in claim 1 in which said sections of the collar are substantially equal and bolts on opposite sides of the collar hold said sections together.

9. An auxiliary sealing structure for a shaft bearing as defined in claim 1 in which said seal is of the labyrinth type and the end of the bearing housing forms one wall of said recess.

10. An auxiliary sealing structure for a shaft bearing as defined in claim 1 in which said seal is of the gasket type and fits snugly in the recess in said collar.

11. An auxiliary sealing structure for a shaft bearing as defined in claim 1 in which the shoulder on said housing is disposed in a groove and the shoulder on said collar is disposed on a rib interlocking with said groove.

* * * * *